Oct. 31, 1967  R. S. GREGOIRE  3,350,249
METHOD OF MAKING IMPREGNATED PLASTIC RIVET
REENFORCED LAMINATED FIBER SHEETS
Filed Dec. 7, 1964  2 Sheets-Sheet 1

INVENTOR.
RESTA S. GREGOIRE
BY *Walter S. Paul*
ATTORNEY.

United States Patent Office 3,350,249
Patented Oct. 31, 1967

3,350,249
METHOD OF MAKING IMPREGNATED PLASTIC RIVET REENFORCED LAMINATED FIBER SHEETS
Resta S. Gregoire, Newport, Pa., assignor to Gregoire Engineering and Development Company, Adelphi, Md.
Filed Dec. 7, 1964, Ser. No. 416,248
10 Claims. (Cl. 156—92)

This invention is directed to reinforced fiber matting and more specifically to a process of preparing reinforced fiber matting. Still further this invention is directed to a method of treating fibrous materials with natural and synthetic resins to form a fiber mat or board. The fibers which are substantially parallel to one another are compressed and coated with the resin to form a uniform mat. The mat is subsequently reinforced with a number of rivets or plugs which penetrate the fibrous mat in a transverse direction. The number and size of the rivets will depend on the thickness and the strength desired of the finished product.

The products of this invention can be used for different purposes and include the preparation of insulation board, roofing, siding, panel board and various other building materials. The fibrous materials to be used include any fibers such as glass, asbestos, natural or synthetic etc.

While plastic or resinous materials have been used as coatings for solid objects, it was believed to be impracticable to use these same resinous materials on permeable fibrous materials because of their inherent structural weakness. It has been found, however, that fiber materials while having no appreciable strength, particularly when the fibers are compressed in a substantially parallel direction can be reinforced or strengthened by bonding the fibers first with a resin coating and then with a plurality of resin rivets or plugs. The product or wall board of this invention are bonded into an integral body having increased compressive strength, high resistance to delamination and good nail-holding power in comparison to the many products known heretofore.

Many of the known fibrous materials have a tendency to delaminate particularly under stress, and various methods have been devised to overcome this problem but none have proved to be completely satisfactory.

Accordingly it is an object of this invention to provide a method of preparing reinforced fiber board by using plastic or resinous rivets or plugs.

More specifically, it is an object of this invention to prepare reinforced fiber board from a plurality of compressed fibers such as glass fibers which have previously been coated with an effective amount of a thermo-setting or thermo-plastic resin. The coated and compressed fibers are then subsequently bonded together by utilizing a plurality of plugs injected into the fiberous mat at spaced intervals.

It is still another object of this invention to provide a method of preparing matted wall board by impregnating the surface with a resinous material which not only reinforces the material but also acts as a water-proofing agent. The extreme or outer surfaces of the board can be completely impregnated with the resin so as to form a uniform surface which can be readily painted or decorated.

It is still another object of this invention to provide a method of preparing a wall board or construction material which contains at spaced intervals a plurality of resinous plugs or rivets. These rivets bind the fibers together so as to prevent any laminar separation.

These and other objects of the invention will become apparent from a further and more detailed description as shown in the accompanying drawings in which FIGURE 1 is a sectional view of a board of fiber matting such as glass, the surface of which may be reinforced with a resinous material to obtain an impervious coating which significantly increases the strength and rigidity of the board.

More particularly, it has been discovered, quite unexpectedly that a new and improved board or mat can be prepared by bonding together a plurality of fibers or fibrous materials. The fibers are bonded together first by coating them with an effective amount of a resinous material and compressing them into a board wherein substantially all of the fibers are parallel to one another. The outer surfaces are coated with an especially thick film of the resin and then subsequently bonded by injecting transversed plugs or rivets. These plugs or rivets are spaced at various intervals, the size and number of which depend on the thickness and strength required of the final product. Thus, as each plug is injected through the mat it forms a rivet holding the two outer film surfaces together to that the fibers are held in a compressed state between the two outer surfaces.

The resinous or plastic material to be used for impregnating the fibers and for forming the outer film surfaces include many of the well known materials. The plugs or rivets which penetrate the board and bond the two outer surfaces are also formed from the same plastic materials. These materials include both the thermo-plastic and thermo-setting synthetic resins as well as the natural resins.

The fibers of the porous mat are coated throughout with resins capable of imparting strength to the mat. The ratio of the resin to the fibrous material may range from about 5 to 40% by weight and in some instances may range from about 10–20% by weight.

Typical examples of a thermo-setting resin include the reaction products of an aldehyde such as fromaldehyde and a phenol such t-butyl phenol, cersol etc. In addition, urea, melamine, and other resin forming derivatives can be condensed aldehydes. The polyesters including the reactions products of polycarboxylic acids with polyhydric alcohols and copolymers of the polyesters with vinyl monomers such as sytrene, vinyl chloride, vinyl acetate, and the like can be used. Other synthetic resinous materials to be used for impregnating the fibers and for forming the plugs include the thermoplastics such as cellulose acetate, cellulose butyrate, methyl methacrylate, polystyrene, polyethylene, polybutene, polyamides, coumarone-indene resins, polyvinyl chloride, polyvinyl acetate, copolymers of these vinyl polymers.

The strength of the fibrous mat can be materially increased by injecting a rivet of the above mentioned resins through the thickness of the material. The number of rivets and their thickness will depend on the thickness of the mat and the specific resin used.

Figure 1:
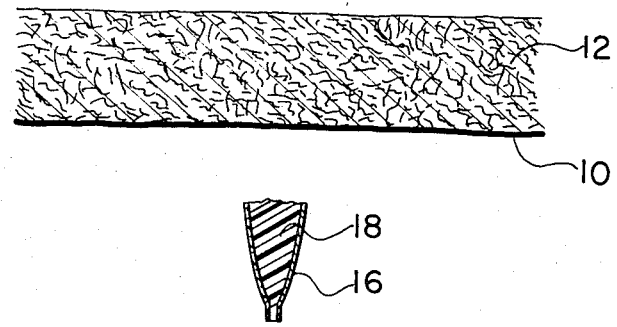
Figure 2:
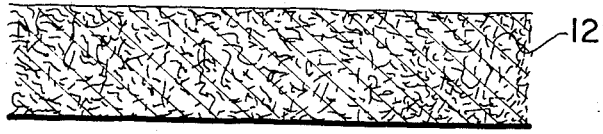
FIGURES 2 to 5 illustrate a method of injecting the reinforcing resin material which forms a rivet in the board as the injecting nozzle is withdrawn. The size and shape of the rivet will depend for the most part on the type of injecting nozzle used.
Figure 3:
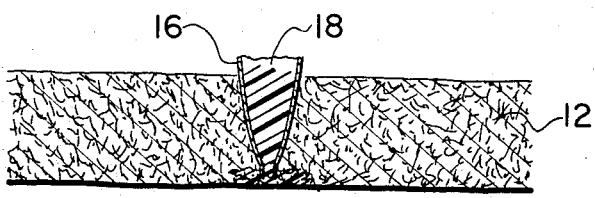
Figure 4:
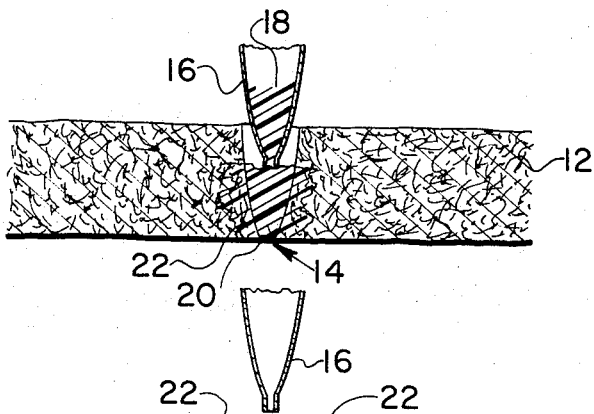
Figure 5:
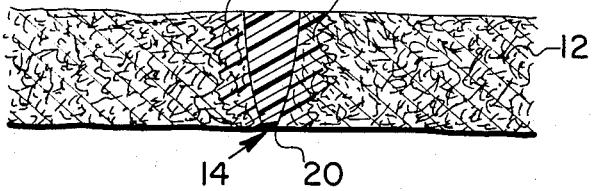

Referring to the drawings, the board 10 comprises a compressed matting 12 of fibers, e.g., fiber glass, which are substantially parallel to the plane of the board. Matting of this type is not very rigid and is subject to laminar separation. A number of injecting slugs 14 of reinforcing plastic or resinous material as illustrated in FIGS. 2 to 5 have been found to reduce the tendency of the board to separate under stresses. A substantially conical injection nozzle 16 is used to pierce through the matting 12, as shown in FIG. 3. As the nozzle 16 is withdrawn, an effective amount of reinforcing resin material 18 is injected to fill the void. A hard core 20 is formed in the void, which is integrated with the impregnating material 22 thus firmly binding the matting strata against any possible cleavage due to bending or other forms of stress. It is possible that some of the plastic or resin material may contract upon hardening and thus form depressions in the upper ends of the cores 20. This however will not affect the strength of the board and can be covered over with outer films of resin.

Figure 6:
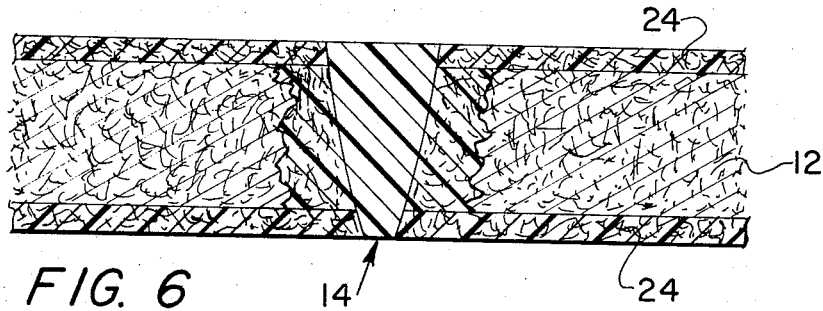
FIGURE 6 is an enlarged sectional view of a board with a heavily, reinforced impregnated surfaces and a rivet bonding said surfaces together.
Figure 7:
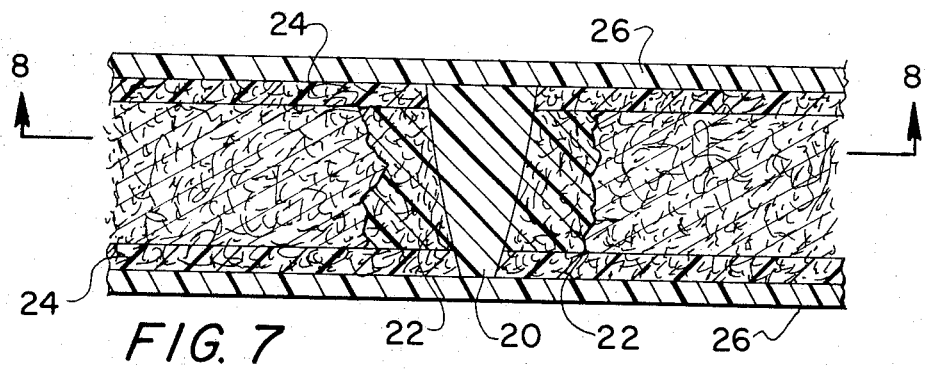
FIGURE 7 is a similar view of a board reinforced with a heavy fiber of the resinous material and on final finish or decorative coating.
Figure 8:
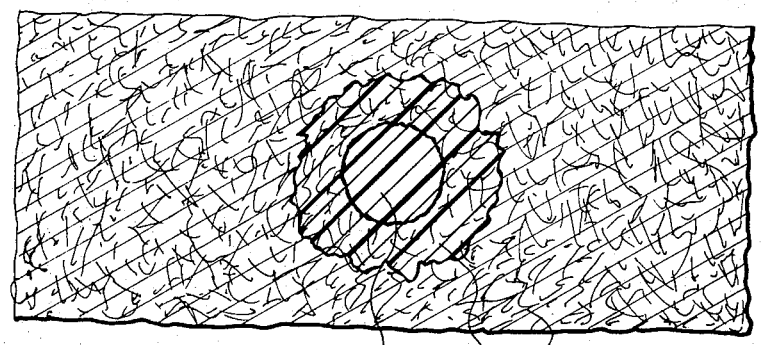
FIGURE 8 is a sectional view of a portion of this board taken along the lines 8—8 of FIG. 7.

To obtain improved strength, the surfaces of the matting 12 may be heavily impregnated or coated with a film of plastic or resinous material 24, either before or after the rivets 14 are formed as shown in FIG. 6. It is the penetration of the rivets 14 through the fibrous mat which holds the fibers together. The fibrous mat may be prepared from a mixture of fibers.

The rivets are bonded through the mat to the outer film surfaces 24. Thus, in effect the fibers are bonded together internally with a coating of the resin and externally by two outer film surfaces which are held together by a number of spaced rivets. The impregnations around the rivets or cores 20 will join the surface impregnations or films 24 to form a continuous reinforced framework for the mating in the board, without seriously affecting the insulating characteristics thereof.

A lamination or finish coating may be applied onto one or both surfaces of the board. The finish coating can be of the same material as the outer layers 24. The thickness of the outer layers 24 and the finish coating 26 together with the thickness of the rivets 20 will depend on the thickness of the fibrous mat. A large number of rivets can be used to reinforce the board but it is important that each of the rivets completely penetrate the mat and form a bond with the outer layers.

That mat per se may be bonded with the resins by any of the known processes and include coating, spraying or dipping. To obtain a formed mat of fixed dimension, the fibers are compressed while the binder or resin is applied under conditions which will cause it to set or harden. Impregnation of the fibers protects them from one another in resisting fiber disintegration caused by abrasion during bending etc.

The injection of the rivets through the coated fibers holds them together as a unified board, both of the outer layers being integrally bonded to the rivets forming a frame work for the fibers.

The fibrous board because of its improved strength can be used for many purposes particularly as insulating panels, wall members, partitions and for many other building purposes.

While this invention has been described with respect to a number of specific embodiments, it is obvious that there are many other variations and modifications that can be resorted to without departing from the scope of this invention, as more particularly pointed out in the appended claims.

What is claimed is:
1. A process for preparing fiber board which comprises compressing and coating a fibrous matting with an effective amount of a resinous material sufficiently to form reenforcing layers on the outer surfaces of said matting firmly bound thereto by partial impregnation thereinto and subsequently piercing said matting at spaced intervals with an injector nozzle; withdrawing said nozzle while injecting an effective amount of a resinous material therethrough into the voids formed thereby, so that said resinous material forms transversal rivets which bond the outer layers together and more rigidly reinforce said matting by impregnation of said rivet material thereinto in the area around said voids.

2. The process of claim 1 further characterized in that the layers of resin on the outer surface of the mat is the same resin used for forming the rivets.

3. The process of claim 1 further characterized in that the resinous material is a thermoplastic resin.

4. The process of claim 1 further characterized in that resinous material is a thermosetting resin.

5. The process of claim 4 further characterized in that the thermosetting resin is a product of an aldehyde and a phenol.

6. The process of claim 3 further characterized in that the thermoplastic resin is a copolymer of vinyl monomers.

7. The process of claim 1 further characterized in that the fibers are coated with a resinous material in an amount ranging from about 5–40% by weight of the fibers.

8. The process of claim 1 further characterized in that the fibrous matting is prepared from glass fibers.

9. The process of claim 1 further characterized in that the fibrous matting is prepared from asbestos fibers.

10. The process of claim 1 further characterized in that the fibrous matting is prepared from a mixture of fibers.

References Cited

UNITED STATES PATENTS

| | | | |
|---|---|---|---|
| 2,159,300 | 5/1939 | Tashjian | 161—53 XR |
| 2,376,698 | 5/1945 | Irvine et al. | 52—744 |
| 2,550,465 | 4/1951 | Gorski | 161—161 XR |
| 2,557,668 | 6/1951 | Lincoln | 161—50 XR |
| 2,775,998 | 1/1957 | Osborn | 117—140 |
| 2,890,481 | 6/1959 | Leahy et al. | 156—500 XR |
| 3,109,763 | 11/1963 | Finger. | |
| 3,216,167 | 11/1965 | Roberts | 52—612 |

FOREIGN PATENTS 145,123  6/1920  Great Britain.

ALEXANDER WYMAN, *Primary Examiner.*

W. A. POWELL, *Examiner.*